March 8, 1938.   R. A. HENRY   2,110,298
APPARATUS FOR GETTING INTO SOLUTION OR SUSPENSION IN A WATER CURRENT
A DETERMINED AND REGULATABLE AMOUNT OF MATERIALS IN
A MOBILE, FINE, OR POWDERY CONDITION
Filed Sept. 10, 1935   5 Sheets-Sheet 1

Inventor:
Rene Auguste Henry
By E. F. Wenderoth
Attorney

March 8, 1938.  R. A. HENRY  2,110,298
APPARATUS FOR GETTING INTO SOLUTION OR SUSPENSION IN A WATER CURRENT
A DETERMINED AND REGULATABLE AMOUNT OF MATERIALS IN
A MOBILE, FINE, OR POWDERY CONDITION
Filed Sept. 10, 1935  5 Sheets—Sheet 2

Inventor:
Rene Auguste Henry
By E. F. Wenderoth
Attorney

March 8, 1938.   R. A. HENRY   2,110,298
APPARATUS FOR GETTING INTO SOLUTION OR SUSPENSION IN A WATER CURRENT
A DETERMINED AND REGULATABLE AMOUNT OF MATERIALS IN
A MOBILE, FINE, OR POWDERY CONDITION
Filed Sept. 10, 1935   5 Sheets-Sheet 4

Inventor:
Rene Auguste Henry
By E. F. Wendoroth
Attorney

March 8, 1938.                R. A. HENRY                2,110,298
APPARATUS FOR GETTING INTO SOLUTION OR SUSPENSION IN A WATER CURRENT
      A DETERMINED AND REGULATABLE AMOUNT OF MATERIALS IN
              A MOBILE, FINE, OR POWDERY CONDITION
                    Filed Sept. 10, 1935      5 Sheets-Sheet 5
fig. 7
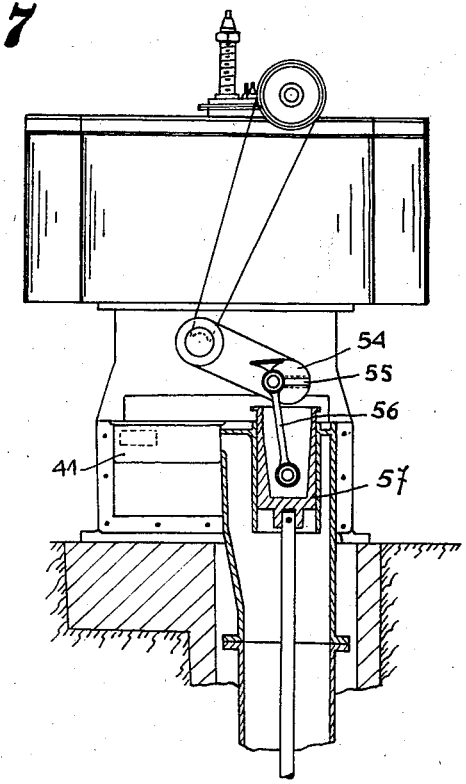
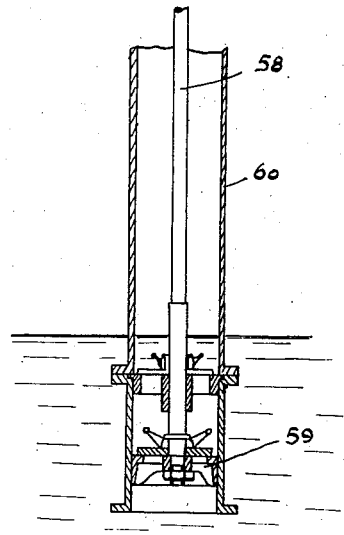
Inventor:
Rene Auguste Henry
By  E. F. Wenderoth
        Attorney Patented Mar. 8, 1938

2,110,298

UNITED STATES PATENT OFFICE 2,110,298

APPARATUS FOR GETTING INTO SOLUTION OR SUSPENSION IN A WATER CURRENT A DETERMINED AND REGULATABLE AMOUNT OF MATERIALS IN A MOBILE, FINE, OR POWDERY CONDITION

René Auguste Henry, Brussels, Belgium

Application September 10, 1935, Serial No. 39,986
In Belgium September 21, 1934

7 Claims. (Cl. 210—1)

The present invention relates to an apparatus for getting into solution or suspension in water a determined and regulatable amount of material in a mobile, fine or powdery condition.

The expression "matter in a mobile, fine or powdery condition" should in the case of the invention, be taken in a wide sense; this expression is intended to cover muddy, sandy, dusty, earthy, clayey, viscous, pebbly, fine, granular, etc. matter.

The getting into suspension or solution of such materials is often slow and very irregular; further they are generally composed by elements of very variable dimensions, so that a current of water regularly concentrated with such materials is practically difficult to obtain.

The present invention concerns an apparatus which carries out the apportionment of materials of a mobile, fine or powdery nature, whether soluble or not, and grinds and levigates them in the water in such a way as to regulate the proportion between the volumes of water and of mobile material, thus obtaining a continuous discharge of liquid with a regulatable content of dissolved or suspended matter.

The invention comprises a grinding apparatus traversed by a current water of regulatable delivery and in which the material to be put in suspension or solution is flowed in a regulatable and continuous manner.

Such an apparatus is particularly advantageous when one desires to manufacture lime water. The solubility of slaked lime in water at 20° C. is very low; it is of the order of 1,650 milligrammes per litre. On the other hand the grains of slaked lime, when placed in water containing $CO_2$, soon become covered with a skin of calcium carbonate which makes them difficult to dissolve, since the solubility of calcium carbonate is only of the order of 13 milligrammes per litre. By grinding these grains under water the skin of calcium carbonate is destroyed and the solubility of the grains is increased by a considerable amount.

In certain processes for purifying waters it is made use of a water current containing clay in suspension or lime in solution, the respective concentration of clay and lime in water being determined and able to be regulated. In order to easily obtain the suspension of clay in lime-water, it is provided, according to the invention, two grinding apparatus, such as above mentioned, in which lime and clay are respectively delivered in a continuous and regulatable manner, and successively traversed by a water-current of regulatable delivery, the respective deliveries of water, lime and clay being dependent one from the other.

The uniform distribution of materials in a mobile, fine, or powdery condition such as slaked lime or clay is difficult in practice because these materials are often heterogeneous, sometimes sticky, sometimes rounded so that they roll or are moist or dry; these phenomena are the more serious as the amounts required at a time are smaller and should be more regular, as is particularly the case when one desires to manufacture clay suspended in lime water; in order to obtain the uniform distribution of these materials and the dependency between the respective amounts of water and materials, the apparatus according to the invention is provided with a motor the speed of which may be regulated and simultaneously driving a pump serving for feeding the grinder and displacing in an axial helical sense, through the material contained in a reservoir disposed above the grinder, a tube opened at its two ends and provided at its above part with scrapers, this tube thus serving for drawing in a continuous and regulatable manner the material into the grinder.

In order to make dependent the respective amounts of water, lime and clay, when manufacturing a suspension of clay in lime water, the lime grinder fed by water pump and the clay grinder fed by water coming from the lime grinder are respectively surmounted by a reservoir provided with a tube axially longitudinally rotating, as above described, whilst the operation of the pump and helical displacement of the two tubes are driven by the same motor, of regulatable speed, the relative speeds of the pump and displacement of each tube being regulatable.

According to the invention, the pump and the said tubes are respectively connected to the motor by means of a regulatable transmission (for instance cone pulleys, crank of regulatable length) for allowing the regulation of the relative speeds of the pump and helical displacement of the tubes.

In order to obtain simultaneously a rotation and a regulatable displacement of the tubes, these are fixed to a vertical screw which is caused to rotate by a horizontal toothed wheel provided with a key slidable in a keyway cut longitudinally in the screw, while the thread of the screw engages in a nut which is also caused to rotate by a second toothed wheel; the whole arrangement enables the screw to be given a differential vertical movement as the result of different speeds of rotation of the screw and of its nut.

According to one advantageous method of carrying out the invention, the grinding apparatus placing materials in solution or in suspension is constituted by a trough with a tough bottom on which rolls and slides a heavy grating having a curved inferior surface, this grating being provided with an oscillating arm connected with play to an operating system moved by the motor of regulatable speed, whilst abutments are provided for limiting the horizontal displacements of the said grating with respect to the bottom of the trough.

In this way the grating may roll, slide on the bottom of the trough, and lift and move over the material, grinding it under its weight.

The accompanying drawings illustrate, by way of example, two forms of construction according to the invention. In these drawings:—

Fig. 1 is a diagrammatic view of an arrangement according to the invention.

Fig. 2 relates to the mechanism connecting helical movement to the tube of the distributor.

Fig. 7 relates to the arrangement for driving the pump.

Figure 1:
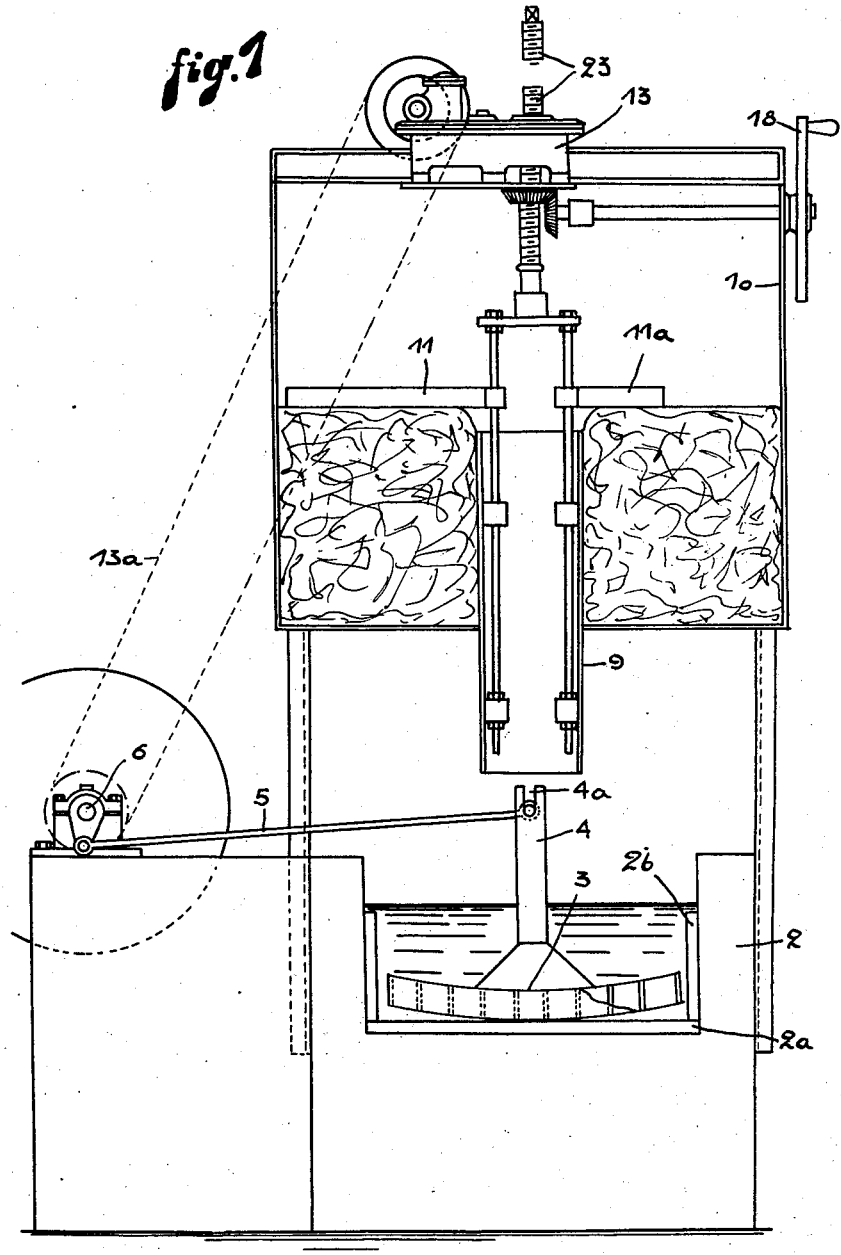
Figure 2:
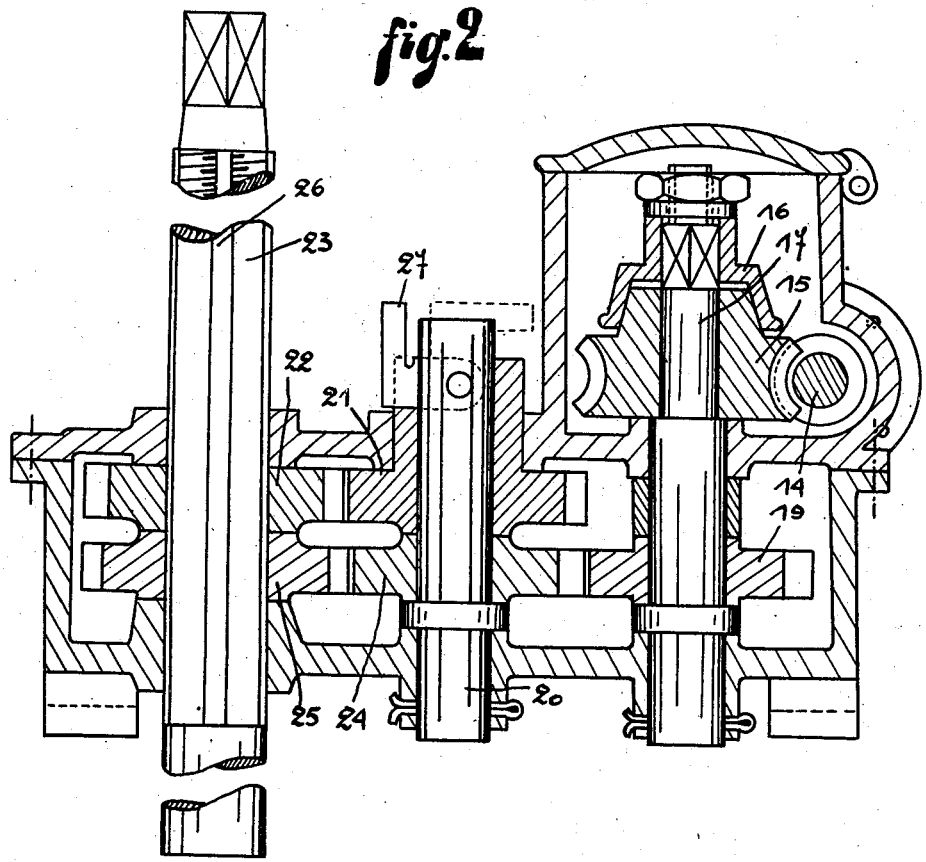
Figure 3:
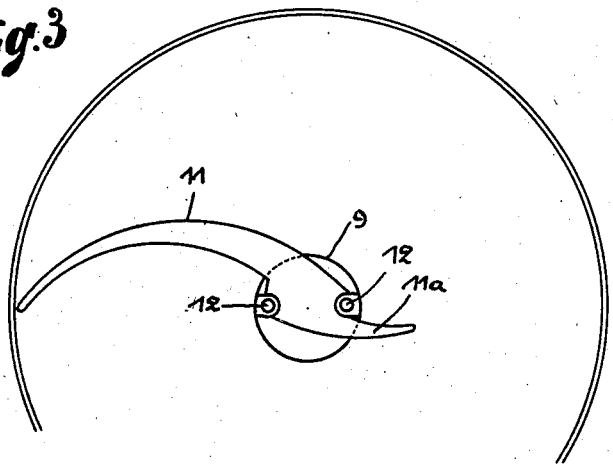
Fig. 3 illustrates the scrapers of the distributor.

In the case of Figures 1 to 3 the grinder is composed of a trough 2, the bottom of which is formed by a plate 2a on which rests a grating 3 of part cylindrical form; the latter being provided with an arm 4 operated by the connecting rod 5 and crank 6 through a coupling at 4a permitting of a certain amount of play in all directions.

Owing to this method of rotation, the grating can roll and slide on the bottom of the trough, knock up against the lateral stops 2b, and lift itself on the material, which it crushes under its weight.

The trough 2 receives in one part the liquid and another part the mobile material, this one being conducted by the central tube 9 of a distributor.

The distributor or apportioning arrangement for the mobile material is composed of a cylindrical fixed vessel 10 containing a certain reserve of mobile material, for example of quick lime. This fixed container is provided axially with a movable central tube 9; scrapers 11 and 11a (see Fig. 3) are fixed to this tube by rods such as 12. The central tube 9 has a regular movement of rotation round its axis and of descent along its axis, the form of the scrapers being such that they continually direct the material towards the centre of the tube; the central tube 9 and the scrapers 11 and 11a act like a boring machine with central removal of the borings.

The movement of rotation and of descent of the axial tube 9 is controlled by a gear box 13 fixed to the top of the vessel 10 and driven from the shaft 6 by means of a belt 13a. This gear box is shown in detail in Fig. 2.

In this driving arrangement, a worm on shaft 14, which is driven by the belt 13a of Fig. 1, drives a worm wheel 15 which is loose on its spindle 17 but which can be coupled with this spindle through a conical clutch plate 16 keyed on the said spindle 17. This coupling is for the purpose of allowing slip in the case of exceptional loads.

On the spindle 17 is keyed a toothed wheel 19 which meshes with a gear wheel 24 keyed on the shaft 20, the wheel 24 meshing with the gear wheel 25 which has internally the form of a nut engaging with the screw 23. This screw is caused to rotate by the wheel 22 which meshes with the gear wheel 21 keyed on the shaft 20. The screw 23 is capable of sliding within the gear wheel 22 and is driven therefrom by means of a key on the wheel slidable in the longitudinal keyway 26. The wheels 22 and 25 are slightly different in size and the screw will have a vertical movement resulting from the different speeds of rotation of the wheels 22 and 25.

The gear wheel 21 is keyed to the shaft 20 through a releasable key 27 which allows of the wheel 21 being set free on the shaft 20; thereby the wheel 22 becomes free and consequently also the screw 23. By this arrangement it is possible to turn the screw 23 independently of the shaft 14, and by means of a mechanism such as 18 (Fig. 1) which may be operated by hand or otherwise, it is possible to raise or lower the screw with the apparatus attached to it.

In the case of Figs. 4 to 7, the apparatus for manufacturing a suspension of clay in lime water comprises two distributor vessels 31 and 32 respectively containing a certain amount of lime and clay in which moves a distributor analogous to this one described in Figure 1. These two vessels 31 and 32 are placed above two grinders 33 and 34 one of which serving for dissolving lime in water and the other for making clay in suspension.

In these two grinders move, as described in Fig. 1, two gratings 35 and 36 operated by means of arms 37 and 38. In the grinder 33 are disposed two dams 39 and 40 for retaining scums and for forcing clay to pass under the grating for grinding it.

Figure 4:
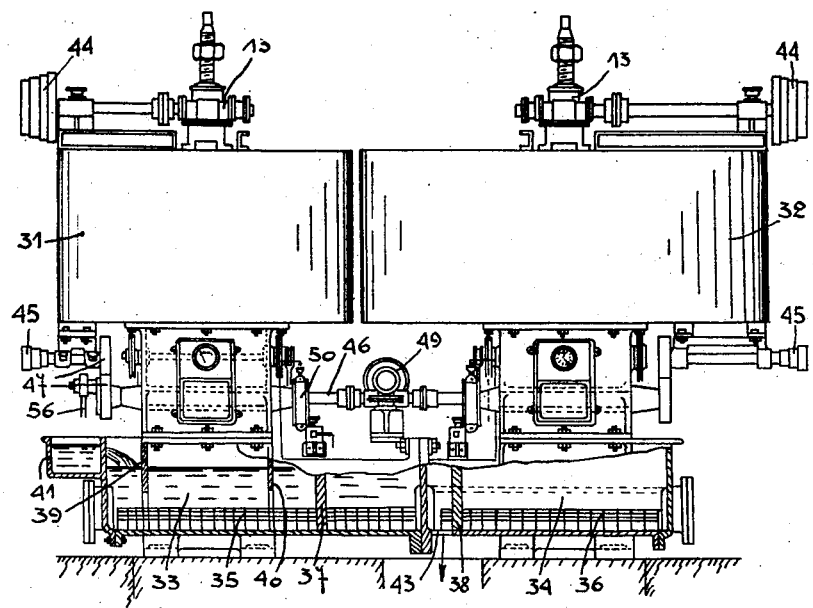
Fig. 4 shows a partial section of an apparatus for manufacturing lime water containing clay in suspension.
Figure 5:
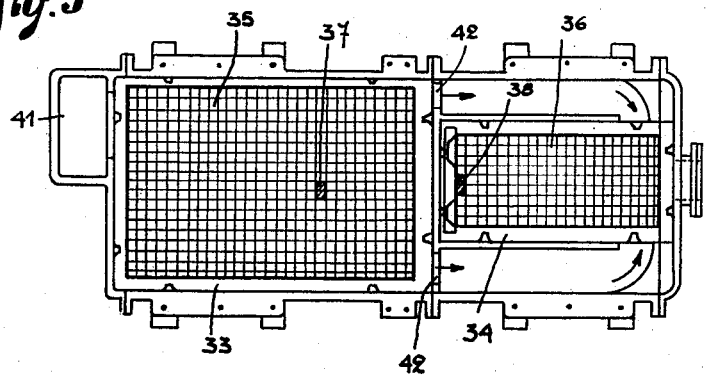
Fig. 5 is a plane view of the gratings and of the grinder of this apparatus.
Figure 6:
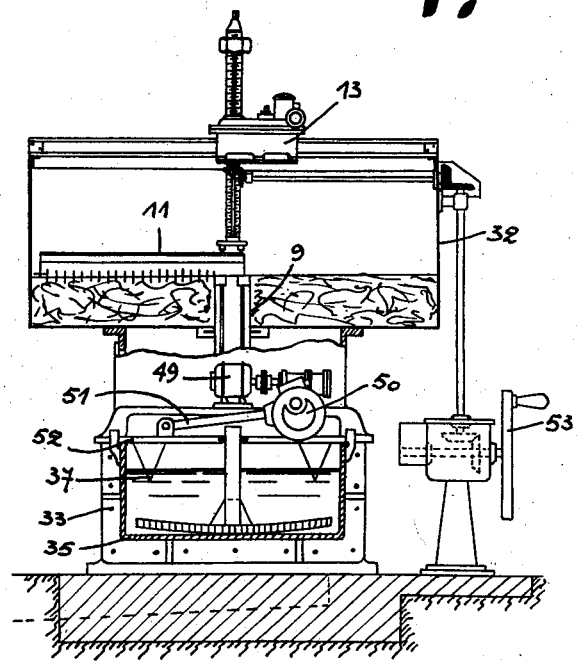
Fig. 6 illustrates the arrangement for operating the gratings.

The water delivery of this grinder takes place from the reservoir 41 fed by a pump which will be described in Fig. 7. The water of this reservoir flows into the grinder 33 where lime is dissolved and the lime water so formed flows by passages 42 (see Fig. 5) to the clay grinder 34. The lime water containing clay in suspension is evacuated by the opening 43 (Fig. 4).

The mechanisms realizing the helical movement of the distributor tubes of the vessels 31 and 32 are operated by means of cone pulleys such as 44 and 45 rotated by a driving shaft 46 by interposition of pulleys such as 47. This driving shaft is moved by an electric motor 49 of variable velocity which runs this shaft by interposition of a speed reductor. The same shaft also serves, as hereinafter said, for operating the oscillating movement of the gratings and the pump feeding the vessel 41.

The oscillating movement of the gratings is obtained from the driving shaft 46 by means of an eccentric such as 50. This eccentric operates by means of an arm 51 a horizontal slide 52 in which is brought into action the end of the driving arm of the grating; the connection between slide 52 and the driving arm is realized in order to permit the breaking-up of the grating.

An exterior crank 53, the function of which is the same as the crank 18 of Fig. 1, serves for rapidly raising again the distributor tube 9 and the scrapers 11; further the driving of the pump from the same driving shaft 46 is effected by means of a pulley 54 operated by the driving shaft and having a diametral groove 55 in which is fixed, in a regulatable position, the end of a connecting-rod 56 operating a guide-piston 57 to which is connected the pump-piston 59 by interposition of a transmission-rod 58. The water pumped by the pump-piston 59 rises through the duct 60 and flows into the reservoir 41 disposed on side of the grinder 33.

By a judicious arrangement of the belt upon the cone pulleys 44 and 45 and by regulation of the stroke of the piston by means of the groove 55 of the pulley 54, it is possible to obtain a regulatable dependency between the amounts of lime-water and clay.

What I claim is:—

1. An apparatus whereby a regulated quantity of loose, comminuted or powdered material may be made to pass into solution or suspension in a current of water leading to a grinder, comprising a crushing device having a trough with a solid bottom, a heavy perforated grating with a lower curved surface, driving means causing the rolling and the sliding of said perforated grating on said solid bottom, means for discharging in a continuous and controllable manner into the trough the material to be put in suspension or solution, and means for passing a current of water through the trough.

2. An apparatus whereby a regulated quantity of loose, comminuted or powdered material may be made to pass into solution or suspension in a current of water leading to a grinder, comprising a crushing device having a trough with a solid bottom, a heavy perforated grating with a lower curved surface, driving means causing the rolling and the sliding of said perforated grating on said solid bottom, a loose connection between said grating and said driving means, means for discharging in a continuous and controllable manner into the trough the material to be put in suspension or solution, and means for passing a current of water through the trough.

3. An apparatus whereby a regulated quantity of loose, comminuted or powdered material may be made to pass into solution or suspension in a current of water leading to a grinder, comprising a crushing device having a trough with a solid bottom, a heavy perforated grating with a lower curved surface, driving means causing the rolling and the sliding of said perforated grating on said solid bottom, a loose connection between said grating and said driving means, stops on the trough for limiting the horizontal sliding motions of said grating, means for discharging in a continuous and controllable manner into the trough the material to be put in suspension or solution, and means for passing a current of water through the trough.

4. An apparatus whereby a regulated quantity of loose, comminuted or powdered material may be discharged into water leading to a grinder in a continuous manner, comprising a container for said material, a tube open at both extremities and vertically disposed in said container, said container having an aperture in front of the lower extremity of said tube, scrapers fitted at the upper end of said tube, means causing said tube to rotate about its axis and simultaneously to descend along said axis.

5. An apparatus whereby a regulated quantity of loose, comminuted or powdered material may be discharged into water leading to a grinder in a continuous manner, comprising a container for said material, a tube open at both extremities and vertically disposed in said container, said container having an aperture in front of the lower extremity of said tube, scrapers fitted at the upper end of said tube, a vertical screw fixed to said tube, a horizontal toothed wheel upon said screw, driving means for said wheel, a key on said wheel, a keyway in said screw and in which said key is slidable, a nut threaded upon said screw, a second toothed wheel for rotating said nut, said second wheel being rotated by said driving means for said first named wheel, the transmission ratios between said driving means and said wheels being determined so that said screw and said nut have different speeds of rotation.

6. An apparatus whereby a regulated quantity of loose, comminuted or powdered material may be discharged into water leading to a grinder in a continuous manner, comprising a container for said material, a tube open at both extremities and vertically disposed in said container, said container having an aperture in front of the lower extremity of said tube, scrapers fitted at the upper end of said tube, a vertical screw fixed to said tube, a horizontal toothed wheel upon said screw, driving means for said wheel, a key on said wheel, a keyway on said screw in which said key is slidable, a nut threaded upon said screw, a second toothed wheel rotating said nut, said second wheel being rotated by said driving means of said first named wheel, the transmission ratios between said driving means and said wheels being determined so that the screw and the nut have different speeds of rotation, a declutching device for said nut and a second driving means for rapid rotation of said nut.

7. An apparatus for manufacturing a suspension of clay in an aqueous solution of lime especially intended for the purification of water, comprising a grinding device, means for discharging lime in a continuous and regulatable manner to said grinding device, a second grinding device, means for discharging clay in a continuous and regulatable manner to said second grinding device, means for causing a regulatable current of water to flow first through said grinding device for said lime and then through said grinding device for said clay, and means regulating the respective amounts of clay, lime and water.

RENÉ AUGUSTE HENRY.